Aug. 22, 1939.   L. J. WHELAN   2,170,360
ROAD SANDER
Filed Dec. 11, 1937   2 Sheets-Sheet 1
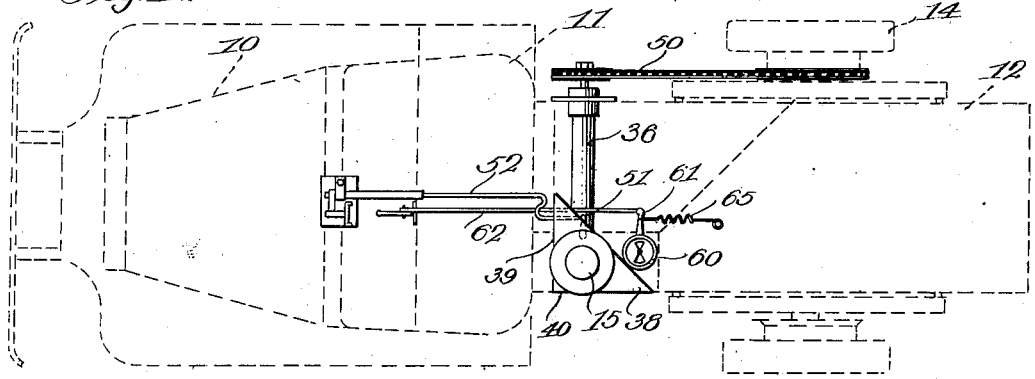
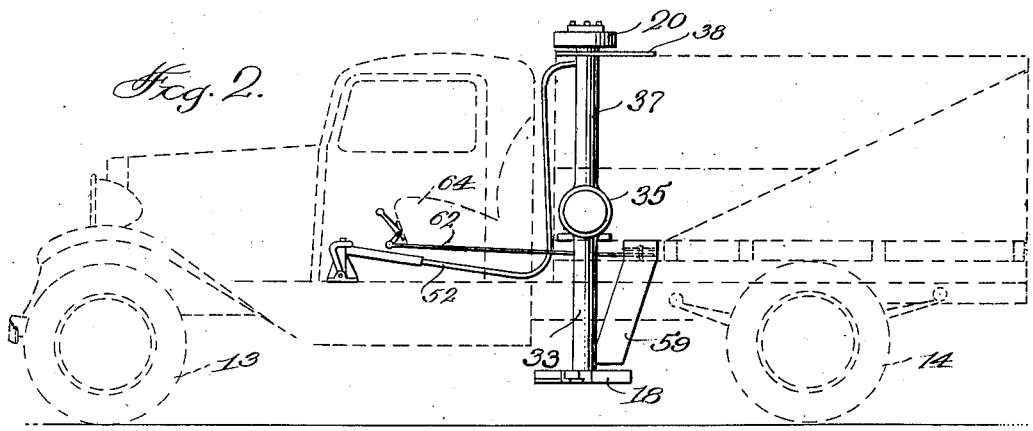
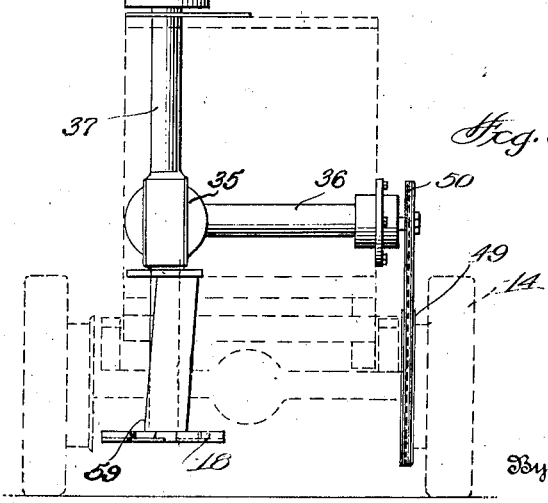
Inventor
Laurence J. Whelan Aug. 22, 1939.  L. J. WHELAN  2,170,360
ROAD SANDER
Filed Dec. 11, 1937  2 Sheets-Sheet 2
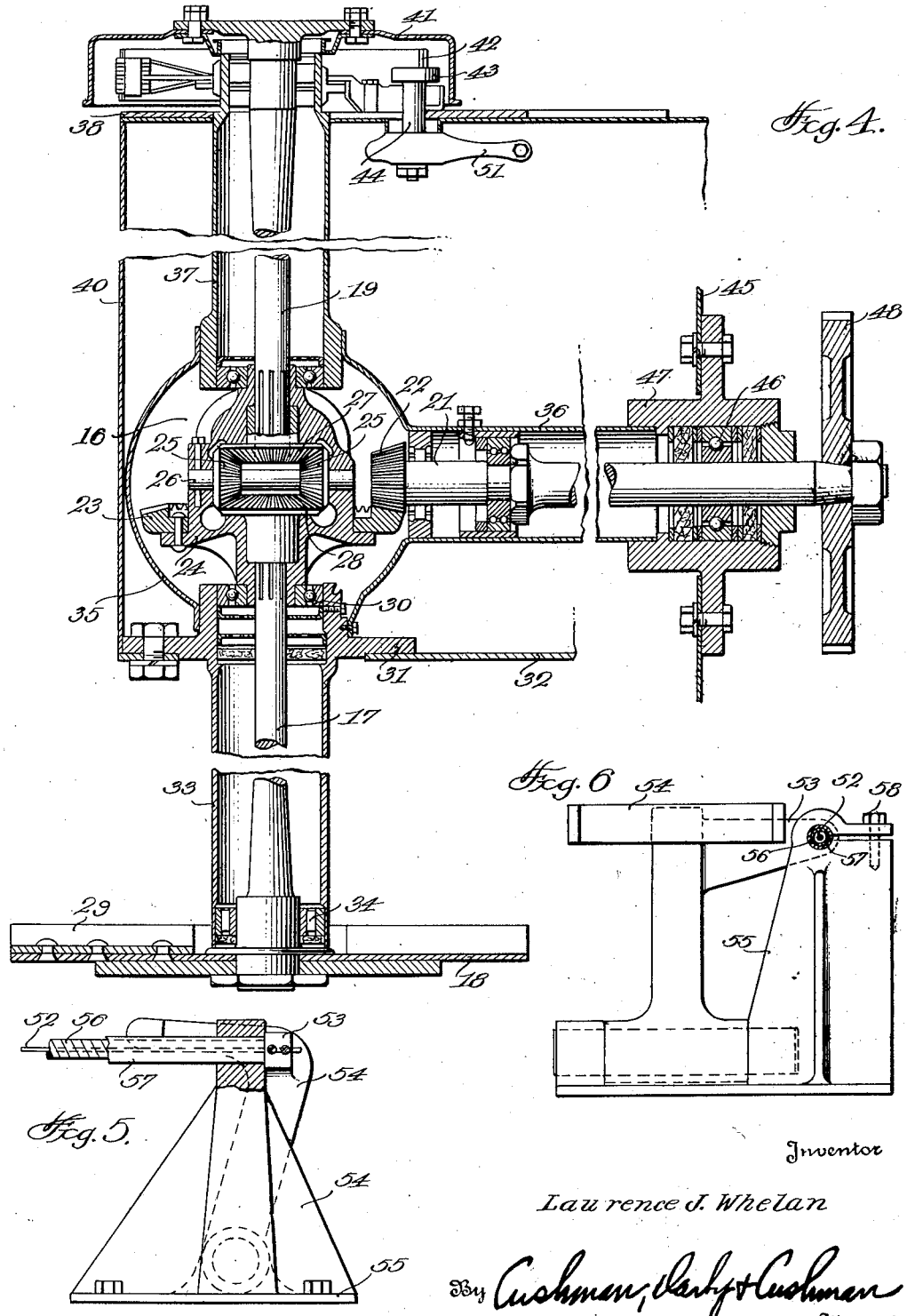
Inventor
Laurence J. Whelan
By Cushman, Darby & Cushman
Attorneys Patented Aug. 22, 1939

2,170,360

UNITED STATES PATENT OFFICE 2,170,360

ROAD SANDER

Laurence J. Whelan, Butte, Mont.

Application December 11, 1937, Serial No. 179,371

9 Claims. (Cl. 275—8)

The present invention relates to material distributors and refers to that type capable of being applied to motor vehicles or vehicle trailers.

An object of the invention is the provision of a material distributor which may be applied as a unit to a motor vehicle or trailer and which is adapted to derive its operating power from the vehicle. The material distributor includes as one of its essential elements a differential driving mechanism which not only drives the distributor mechanism but permits the speed of the same to be controlled, so that the volume of the material may be regulated as it is being distributed.

A further object comprises the employment of pedal operated connections to the differential driving mechanism and the distributor mechanism whereby the operator of the vehicle may at all times control the speed of rotation of the distributor and the amount of material fed to the distributor without leaving the driver's seat.

An additional advantage of this invention is the provision of means which permits changing the speed of the distributing mechanism without the necessity of stopping the vehicle.

With the foregoing and other objects in view, the invention will now be more fully described, reference being had to the accompanying drawings, in which:

Figure 1 is a top plan view of the invention with the distributor and its operating connections shown in full lines and the truck shown in dotted lines;

Figure 2 is a side elevation thereof;

Figure 3 is a rear view thereof.

Figure 4 is an enlarged sectional view of the distributor, and

Figures 5 and 6 are details of the operating pedal.

Referring now to the drawings, the numeral 10 designates a truck having a cab 11, body 12 and front and rear wheels 13 and 14, respectively. My distributor is designated generally by the numeral 15 and is mounted on the body 12 of the truck adjacent the front end thereof. As shown, the distributor is vertically positioned on the body and comprises a differential driving mechanism indicated generally by numeral 16, a lower driven shaft 17 carrying a distributor disc 18, and an upper driven shaft 19 associated with a braking mechanism 20. A power shaft 21 is horizontally mounted on the body of the truck and is adapted to transmit power through the differential driving mechanism to the distributor disc 18. The source of power may be derived from a separate driving unit, but, in the present instance, the shaft 21 takes its power from the rear right wheel 14 of the truck.

Referring now to Figure 4, the differential driving mechanism and its connections to the distributor disc and the braking mechanism is shown in detail. The driving shaft 21 is provided with a pinion 22, which meshes with a ring gear 23 of the differential driving mechanism. This mechanism may constitute the usual type of differential, and, in the present instance, the ring gear 23 is rigidly mounted on a planetary housing or gear carrier 24. A pair of planetary gears 25 are suitably journalled on a stub shaft 26 carried by the planetary housing, and these gears mesh with upper and lower bevel gears 27 and 28, respectively. The bevel gear 27 is mounted on the lower end of the upper driven shaft 19, while the lower gear 28 is mounted on the upper end of the lower driven shaft 17.

The distributor disc 18 is carried by the lower free end of the shaft 17 and is provided with a plurality of radial ribs 29 of substantially angle iron construction, which assist in distributing or scattering the material feed to the disc.

The lower shaft 17 is journalled in suitable bearings 30 carried by a supporting plate or bracket 31, which in turn is mounted on the floor 32 of the truck body 12. A sleeve 33 constituting a shaft housing projects downwardly from the bracket 31 and carries a lower shaft bearing 34. With this arrangement, the lower shaft 17 and disc 18 are adequately supported by and suspended from the truck body.

A casing 35 is also supported on the bracket 31, and encloses the differential mechanism and the inner ends of the driven shafts. This housing is extended horizontally to form a sleeve 36, which encloses a substantial part of the power shaft 21. Another sleeve 37 extends upwardly from the casing 35 to shield the upper driven shaft 19 and is connected to a brake supporting plate 38 mounted on the top of the front and side walls 39 and 40 respectively, of the truck body.

The brake mechanism comprises a drum 41 mounted on the upper free end of the driven shaft 19 and an internal brake band 42 carried by the plate 38. This brake mechanism may be of any desired type, and, as is usual in such constructions, an expanding cam 43 is mounted on the cam shaft 44 which is suitably carried by the plate 38. With this arrangement, the drum 41 is rotated with the driven shaft 19, while the brake band 42 is stationary and is adapted to be expanded into contact with the drum for controlling the speed of the shaft 19.

The outer end of the power shaft 21 projects through the right-hand side wall 45 of the truck body, and is journalled in bearings 46 mounted in a housing 47. This housing projects through an opening in the wall 45 and is secured to both the wall and the outer end of the sleeve 36. A sprocket gear 48 is secured to the extreme outer end of the power shaft 21 exteriorly of the body and is connected to a second sprocket gear 49 (see Figs. 1 and 3) by means of the sprocket chain 50. The gear 49 is mounted on the rear wheel 14, and thus power is transmitted through the sprocket gear arrangement to the power shaft 21 and through the differential mechanism to the distributor disc 18.

Referring again to Figures 1 to 3, the cam shaft 44 has mounted thereon an operating lever 51, and this is connected to one end of a flexible wire or cable 52. This cable extends forwardly to the cab 11 and its front end is suitably clamped in an arm 53 projecting laterally from a pedal 54, pivotally mounted at its lower end in a bracket 55 secured to the floorboard of the cab 11. Preferably, the cable 52 operates in a protective casing 56 and this casing, adjacent the point where the cable is connected to the pedal, is enclosed in a sleeve 57. The front of the sleeve and casing, as shown in Figures 5 and 6, are clamped in the top of the bracket 55 by a set screw 58. Upon actuation of the pedal 54 the cable 52 is moved in its casing 56 and operates the brake band 42 through the cam 43.

The distributor 18 is adapted to distribute or scatter sand, rock chips, or any other crushed or pulverized material for either sanding roads or applying a surface to the road during repairing or construction thereof. The material to be distributed is carried in the body 12 of the truck and is conveyed to the distributor through a chute 59. This chute is supported in and suspended from the floor of the truck, as clearly shown in Figure 2. Means are positioned in the top of the chute 59 for controlling the flow of material to the distributor disc. This means comprises a shutter 60, which is capable of being adjusted to increase or decrease the size of the shutter openings to determine the rate of flow of the material to be distributed. The shutter is connected to a laterally extending arm 61, which in turn is pivotally connected to a forwardly extending rod 62. The front end of this rod is connected to an operating handle 63 pivotally mounted on the driver's seat 64, or, in any other convenient position where the driver may operate the handle to control the position of the shutter. A spring 65 has one end thereof secured to the arm 61 to normally retain the shutter in closed position.

With the construction as above described, and assuming that the vehicle is travelling along a road to be sanded or upon which material is to be distributed, the distributor disc 18 and the lower driven shaft 17 will remain stationary, while the shaft 19 and the brake drum 41 will be rotating at a relatively high speed. This is due to the fact that the distributor disc is substantially heavier than the brake drum 41 and therefore the differential driving mechanism will rotate that shaft which offers the least resistance. When it is desired to place the disc 18 in operation, and assuming that the shutter has been adjusted to the desired position, the pedal 54 is depressed by the operator. This expands the brake band 43 against the drum 42, cutting down the speed of the driven shaft 19 and through the differential mechanism causes rotation of the driven shaft 17 and the disc 18. It will be apparent that as the speed of the brake drum 41 and driven shaft 19 is diminished, the speed of the shaft 17 and disc 18 is increased. When the brake drum is expanded sufficiently to entirely prevent movement of the drum 41, the disc 18 will be rotating at its maximum speed. Thus, with this construction, the operator may at all times control the speed of the disc 18 through the actuation of the pedal 54.

If desired, quadrants or other calibrated plates (not shown) may be positioned adjacent the pedal 54 and the operating arm 63. The markings on these elements may be calibrated to various road speeds, whereby the pedal 54 and handle 63 may be set at certain designated positions to control the discharge of a predetermined quantity of material. It is to be understood that the pedal 54 and handle 63 may be located at any position convenient to the driver so that he may control the speed of the distributor disc and the shutter as desired. Furthermore, the distributor may be mounted on any type of vehicle and such changes may be made as fall within the purview of one skilled in the art without departing from the spirit of the invention and the scope of the appended claims.

I claim:

1. A material distributing device comprising a unit adapted to be applied to a vehicle and including a power shaft, a differential driving mechanism connected to said shaft, a pair of driven shafts operated from said differential driving mechanism, a material distributing mechanism operated by one of said driven shafts, and means associated with the other driven shaft for controlling the operation of the material distributing mechanism.

2. A material distributing device comprising a unit adapted to be aplied to a vehicle and including a power shaft, a differential driving mechanism connected to said shaft, a pair of driven shafts operated from said differential driving mechanism, a material distributing mechanism operated by one of said driven shafts, and braking mechanism associated with the other driven shaft for controlling the speed of the material distributing mechanism.

3. In a material distributing device for use on vehicles, a power shaft, a differential driving mechanism connected to said shaft, a pair of driven shafts operated from said differential driving mechanism, a material distributing disc operated by one of said driven shafts, and braking mechanism associated with the other driven shaft for controlling the speed of the material distributing disc.

4. In a material distributing device for use on vehicles, a power shaft, a differential driving mechanism connected to said shaft, a pair of driven shafts operated from said differential driving mechanism and adapted to be mounted on a vertical axis on the vehicle, a material distributing disc mounted on the lower driven shaft, and braking mechanism associated with the upper driven shaft for controlling the speed of the material distributing disc.

5. In a material distributing device for use on vehicles, a power shaft, a differential driving mechanism connected to said shaft, a pair of driven shafts operated from said differential driving mechanism and adapted to be mounted on a vertical axis on the vehicle, a material distributing disc mounted on the lower end of the lower driven shaft, a brake drum mounted on the upper end of the upper driven shaft, and a brake band mounted on a non-rotating part of the device within the brake drum and adapted, when expanded, to control the speed of the driven shafts and of the distributing disc.

6. A material distributing device comprising a unit adapted to be applied to a vehicle and including a power shaft, a differential driving mechanism connected to said shaft, a material distributing mechanism operatively connected to said differential driving mechanism and driven through the latter by said power shaft, and means associated with said differential driving mechanism for controlling the operation of the material distributing mechanism.

7. In a material distributing device for use on vehicles, a power shaft, a differential driving mechanism connected to said shaft, a material distributing mechanism operatively connected to said differential driving mechanism and driven through the latter by said power shaft, and braking mechanism associated with said differential driving mechanism for controlling the speed of the material distributing mechanism.

8. In a material distributing vehicle, a material distributor mounted on the vehicle, means for supplying material to the distributor, means for driving the distributor from the vehicle, a differential driving mechanism interposed between the distributor and the driving means and functioning only as means for operating the distributor, and means associated with the differential driving mechanism for controlling the operation of the distributor.

9. In a material distributing vehicle, a material distributor mounted on the vehicle, means for supplying material to the distributor, means for driving the distributor from the vehicle, a differential driving mechanism interposed between the distributor and the driving means, and braking mechanism associated with the differential driving mechanism for controlling the speed of the distributor.

LAURENCE J. WHELAN.